US011355994B2

(12) United States Patent
Kizu et al.

(10) Patent No.: US 11,355,994 B2
(45) Date of Patent: Jun. 7, 2022

(54) MOTOR AND ELECTRIC POWER STEERING SYSTEM

(71) Applicant: Nidec Corporation, Kyoto (JP)

(72) Inventors: Takahiro Kizu, Kyoto (JP); Ryosuke Kozu, Kyoto (JP); Yuichi Nishikawa, Kyoto (JP); Takahiro Hisada, Kyoto (JP); Takanobu Oyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 179 days.

(21) Appl. No.: 16/636,382

(22) PCT Filed: Aug. 6, 2018

(86) PCT No.: PCT/JP2018/029460
§ 371 (c)(1),
(2) Date: Feb. 4, 2020

(87) PCT Pub. No.: WO2019/054090
PCT Pub. Date: Mar. 21, 2019

(65) Prior Publication Data
US 2020/0177045 A1 Jun. 4, 2020

(30) Foreign Application Priority Data
Sep. 15, 2017 (JP) .............................. JP2017-178252

(51) Int. Cl.
*H02K 5/22* (2006.01)
*H02K 3/50* (2006.01)
(Continued)

(52) U.S. Cl.
CPC .............. *H02K 5/225* (2013.01); *H02K 3/50* (2013.01); *H02K 5/1732* (2013.01); *H02K 5/22* (2013.01);
(Continued)

(58) Field of Classification Search
CPC ............ H01R 13/5205; H01R 13/5221; H01R 13/52; H02K 5/225; H02K 3/50;
(Continued)

(56) References Cited

U.S. PATENT DOCUMENTS 5,414,318 A     5/1995  Shimizu et al.
5,659,213 A  *  8/1997  Imashiro ................ H02K 5/225
                                                      310/71

(Continued)

FOREIGN PATENT DOCUMENTS

CN      106208471 A    12/2016
JP      63-187561 U    12/1988
(Continued)

OTHER PUBLICATIONS

Omi et al, Motor Terminal Connection Structure, Jun. 10, 2013, JP 2013115935 (English Machine Translation) (Year: 2013).*

(Continued)

*Primary Examiner* — Quyen P Leung
*Assistant Examiner* — Alexander A Singh
(74) *Attorney, Agent, or Firm* — Keating & Bennett

(57) ABSTRACT

A bush attached to a through hole of a casing of a motor holds a conductor. The bush includes a main body, an insertion hole, a flange, and a rib. The main body includes a first end surface, a second end surface facing the first end surface in a first direction, and side surfaces between the first end surface and the second end surface. The insertion hole penetrates an inside of the main body in the first direction, and allows the conductor to pass through. The flange protrudes from a side surface in a direction perpendicular or substantially perpendicular to the first direction. The rib protrudes from the side surface in a direction perpendicular or substantially perpendicular to the first direction.

13 Claims, 14 Drawing Sheets

(51) Int. Cl.
    *H02K 5/173*     (2006.01)
    *B62D 5/04*     (2006.01)

(52) U.S. Cl.
    CPC ........ *B62D 5/0409* (2013.01); *H02K 2203/09* (2013.01)

(58) Field of Classification Search
    CPC ........ H02K 11/30; H02K 11/215; H02K 3/38; H02K 3/522; H02K 11/33; H02K 5/22; H02K 5/10; H02K 5/15; H02K 5/04; H02K 5/24; H02K 5/08; H02K 5/161; H02K 7/14; H02K 7/116; H02K 5/1732; H02K 2203/09; H02K 3/215; B62D 5/0409; B62D 5/0406
    USPC ...................................... 310/71, 89
    See application file for complete search history.

(56) References Cited

U.S. PATENT DOCUMENTS

| | | | | |
|---|---|---|---|---|
| 8,362,665 | B2* | 1/2013 | Chamberlin | H02K 5/225 310/71 |
| 8,992,249 | B2* | 3/2015 | Kobayashi | H01R 13/6591 439/548 |
| 2014/0093408 | A1* | 4/2014 | Adaniya | H02K 3/50 417/410.5 |
| 2015/0318752 | A1* | 11/2015 | Collins | H02K 11/33 310/64 |
| 2016/0181885 | A1* | 6/2016 | Yamasaki | B62D 5/0403 180/443 |
| 2016/0190728 | A1* | 6/2016 | VanZuilen | H01R 13/5202 310/71 |
| 2016/0336831 | A1 | 11/2016 | Horizumi et al. | |

FOREIGN PATENT DOCUMENTS

| | | |
|---|---|---|
| JP | 09-140081 A | 5/1997 |
| JP | 09-215260 A | 8/1997 |
| JP | 09-266651 A | 10/1997 |
| JP | 2013-115935 A | 6/2013 |
| JP | 2013115935 A * | 6/2013 |
| JP | 2016-214034 A | 12/2016 |

OTHER PUBLICATIONS

Official Communication issued in International Patent Application No. PCT/JP2018/029460, dated Oct. 9, 2018.

\* cited by examiner

MOTOR AND ELECTRIC POWER STEERING SYSTEM

CROSS REFERENCE TO RELATED APPLICATIONS

This is a U.S. national stage of PCT Application No. PCT/JP2018/029460, filed on Aug. 6, 2018, and priority under 35 U.S.C. § 119(a) and 35 U.S.C. § 365(b) is claimed from Japanese Application No. 2017-178252, filed Sep. 15, 2017; the entire disclosures of each application are hereby incorporated herein by reference.

FIELD OF THE INVENTION

The present disclosure relates to a motor and an electric power steering system.

BACKGROUND

Conventionally, a motor using an insulating rubber bush for fixing a coil wire to a housing is known. For example, a conventional bush has a flange at the upper end and a rib at the lower end. The bush is fixed to a wall part of the motor by fitting the peripheral portion of the insertion hole of the motor wall part between the flange and the rib.

The bush has a flange and a rib protruding in the same direction at the upper end and the lower end. For this reason, it is difficult to mold the bush because, for example, cracks are likely to occur in the bush when the upper and lower molds are pulled out during molding of the bush. On the other hand, the molded bush is required to have a shape that can be firmly fixed to the casing of the motor.

SUMMARY

A motor according to an example embodiment of the present disclosure includes a rotor, a stator, a casing, a bush, and a conductor. The rotor is rotatable about a central axis. The stator is radially opposed to the rotor. The casing includes at least one through hole and covers at least a portion of the rotor and the stator. The bush is held in the through hole of the casing. The conductor is connected to the stator and held by the bush. The bush includes a main body, an insertion hole, a first protrusion, and a second protrusion. The main body includes a first end surface, a second end surface facing the first end surface in a first direction, and a side surface between the first end surface and the second end surface. The insertion hole penetrates an inside of the main body in the first direction, and allows the conductor to pass through. The first protrusion protrudes from a side surface in a direction orthogonal to the first direction. The second protrusion protrudes from the side surface in a direction perpendicular or substantially perpendicular to the first direction at a position different from a position of the first protrusion in the first direction. On a plane viewed from the first direction, the positions of the first protrusion and the second protrusion are different from each other.

An electric power steering system according to an example embodiment of the present application includes the motor described above.

The above and other elements, features, steps, characteristics and advantages of the present disclosure will become more apparent from the following detailed description of the example embodiments with reference to the attached drawings.

DETAILED DESCRIPTION

Figure 1:
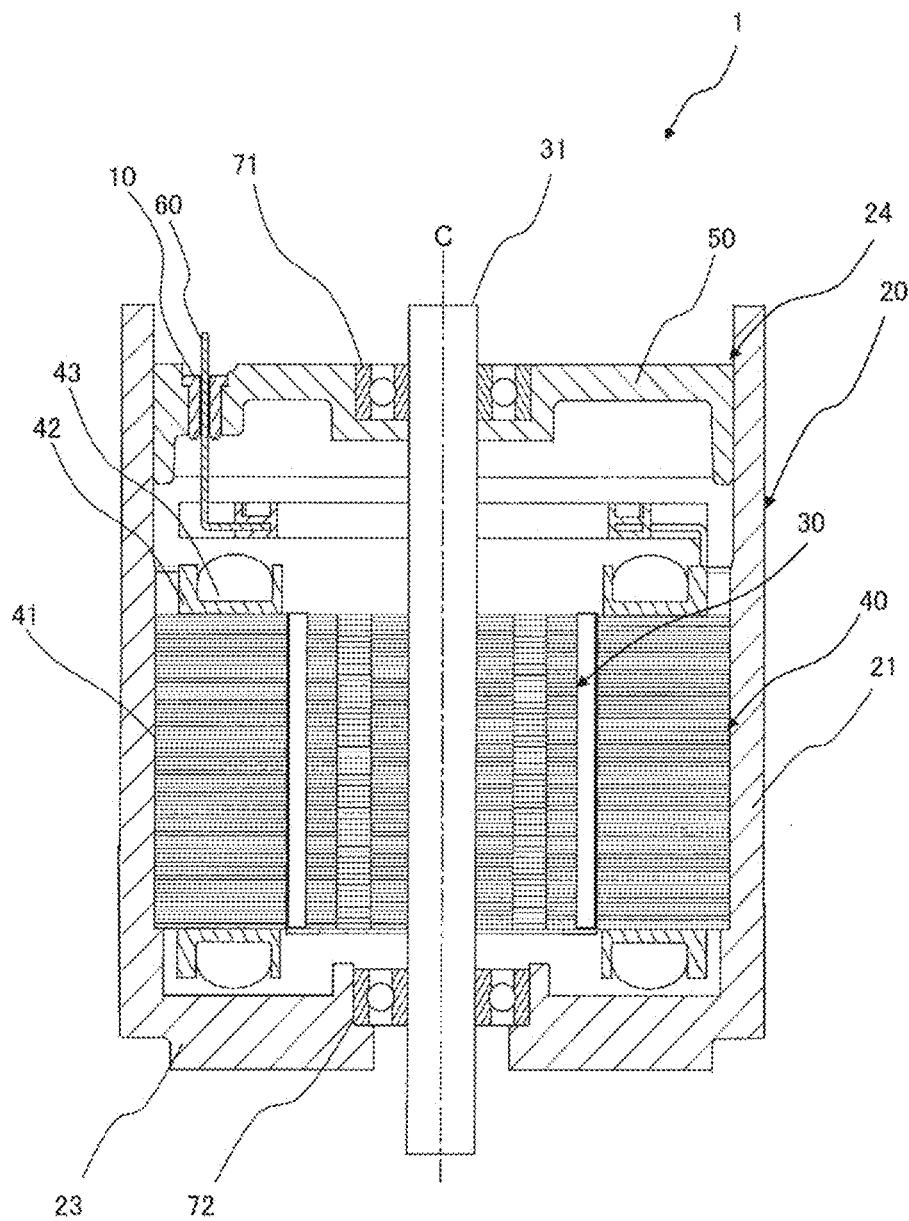
FIG. 1 is a cross-sectional view showing a motor according to an example embodiment of the present disclosure.

Hereinafter, example embodiments of the present disclosure will be described with reference to the drawings. Note that the scope of the present disclosure is not limited to the following example embodiments, but may be arbitrarily changed within the technical spirit of the present disclosure.

In the following description, the central axis of the motor is denoted by a reference sign C. The direction in which the central axis C extends is an axial direction. One along the axial direction is an upper side and the other is a lower side. However, the upper and lower direction in this specification is used to specify the positional relationship, and does not limit the actual direction or positional relationship. The direction of gravity is not necessarily downward. In this specification, a direction perpendicular to the rotation axis of the motor is referred to as a "radial direction". The direction along the arc centered on the rotation axis of the motor is called a "circumferential direction".

Furthermore, in the present description, "axially extending" includes a state of strictly extending in the axial direction and a state of extending in a direction inclined at less than 45 degrees relative to the axial direction. Similarly, in the present description, "radially extending" includes a state of strictly extending in the radial direction and a state of extending in a direction inclined at less than 45 degrees relative to the radial direction.

In the present description, "opposing" does not necessarily mean that the surfaces face each other in parallel.

The term "orthogonal" does not need to be strictly orthogonal, but also includes the meaning of being substantially orthogonal and not being parallel, that is, intersecting.

An "insertion hole" is not limited to a shape in which the peripheral edge is completely surrounded, but includes a groove-like shape in which a part of the peripheral edge is open.

In the drawings used in the following description, for the purpose of emphasizing the characteristic part, the characteristic part may be shown in an enlarged manner for convenience. Therefore, the dimensions and ratios of each component are not necessarily the same as actual ones.

Figure 2:
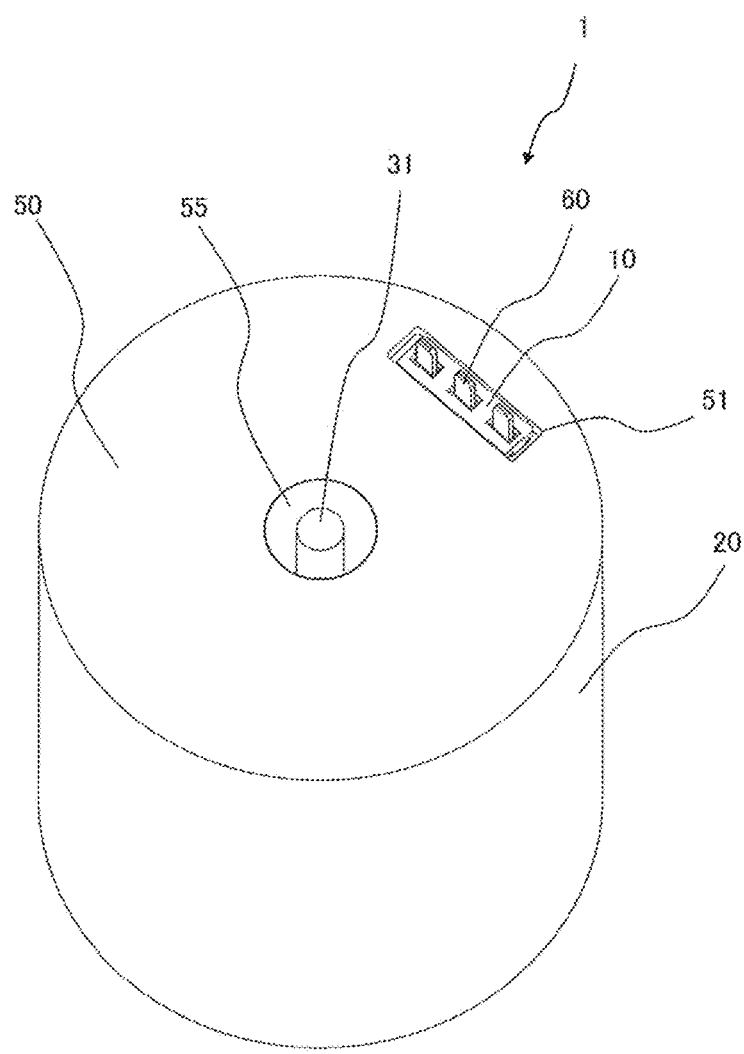
FIG. 2 is a perspective view of a motor.

As shown in FIGS. 1 and 2, a motor 1 includes a housing 20, a rotor 30, an upper bearing 71, a lower bearing 72, a stator 40, a bus bar 60, a bush 10, and a bearing holder 50.

The housing 20 has a bottomed cylindrical shape with the central axis C as the center. The housing 20 includes a cylindrical portion 21 that extends axially, a bottom portion 23 that is positioned at the lower end of the cylindrical portion 21, and an opening portion 24 that opens upward. To the housing 20, a stator 40 and a bearing holder 50 are fixed in order from the lower side. The housing 20 also houses the rotor 30 therein.

The shape of the housing 20 is not limited to a cylindrical shape. The shape of the housing 20 can be changed as long as the stator 40 and the bearing holder 50 can be held on the inner peripheral surface. The cross section of the housing 20 may be a polygon, for example. Further, the housing 20 may be cylindrical instead of bottomed.

The rotor 30 has a shaft 31 extending along the central axis C. The rotor 30 rotates about the central axis C together with the shaft 31.

The upper bearing 71 and the lower bearing 72 support the shaft 31 so as to be rotatable about the central axis C. The upper bearing 71 is supported by a bearing holder 50 described later. The lower bearing 72 is held on the bottom portion 23 of the housing 20.

The stator 40 is disposed on the radially outer side of the rotor 30 so as to face the rotor 30. The stator 40 includes a stator core 41, an insulator 42, and a coil wire 43. The insulator 42 is attached to a tooth (not shown) of the stator core 41. The coil wire 43 is configured of a conductive wire, and is wound around a tooth with an insulator 42 interposed. The outer peripheral surface of the stator 40 is fixed to the inner peripheral surface of the housing 20.

The conductive wire drawn out from the coil wire 43, wound around the stator 40, to the upper side of the stator 40 is connected to the bus bar 60.

The bus bar 60 is a plate-like conduction member. The bus bar 60 electrically connects the coil wire 43 to an external connection terminal and a control board. The bus bar 60 is held by the bush 10 described later.

In the present example embodiment, the bus bar 60 is cited as an example of the conduction member held by the bush 10, but the present disclosure is not limited to this. It may be a coil lead wire drawn out from the coil wire 43, a conductive wire extending from a control board accommodated in the housing 20, or the like.

Figure 3:
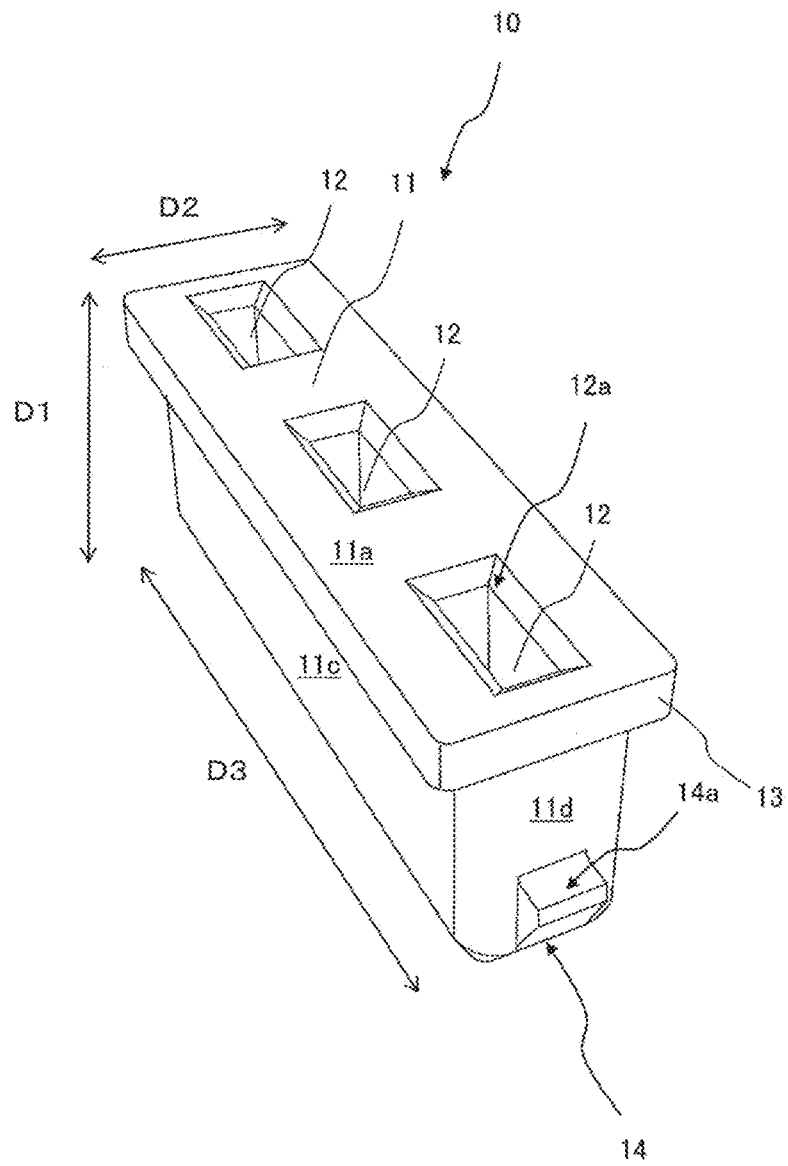
FIG. 3 is a perspective view of a bush.
Figure 4:
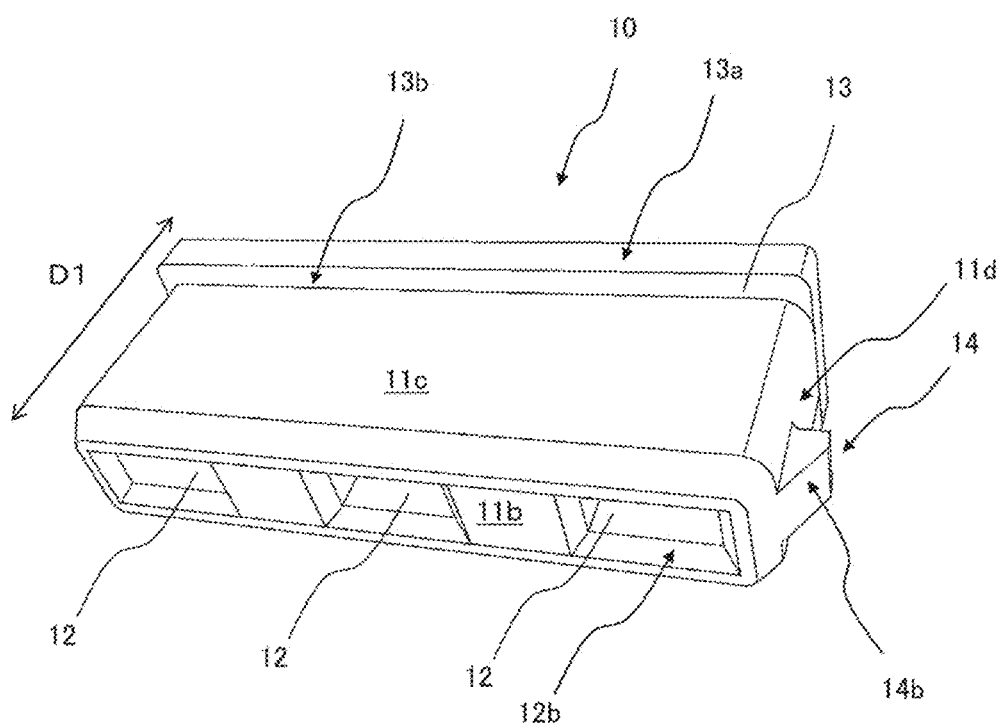
FIG. 4 is a perspective view of the bush of FIG. 3 as viewed from below.

As shown in FIGS. 3 and 4, the bush 10 includes a main body 11, an insertion hole 12, a flange 13, and a rib 14.

In the present example embodiment, the main body 11 is a substantially rectangular parallelepiped. The main body 11 has a first end surface 11a, a second end surface 11b, a pair of first side surfaces 11c, and a pair of second side surfaces 11d. The second end surface 11b opposes the first end surface 11a in the first direction D1. The pair of first side surfaces 11c oppose each other in a second direction D2 orthogonal to the first direction D1. The pair of second side surfaces 11d oppose each other in a third direction D3 orthogonal to the first direction D1 and the second direction D2.

In the present example embodiment, the first direction D1 coincides with the axial direction of the motor 1. The second direction D2 corresponds to the short side direction of the main body 11 and is along the radial direction of the motor 1. The third direction D3 corresponds to the longitudinal direction of the main body 11, and is along the circumferential direction of the motor 1. In the motor 1, the first end surface 11a of the bush 10 is located on the upper side, and the second end surface 11b is located on the lower side.

In the present example embodiment, three insertion holes 12 are provided. The insertion holes 12 are arranged side by side in the third direction D3. That is, the insertion holes 12 are disposed along the longitudinal direction of the bush 10. Each insertion hole 12 is rectangular when viewed from the first direction D1. The insertion hole 12 penetrates the inside of the main body 11 in the first direction D1. In the present example embodiment, the insertion hole 12 allows the bus bar 60 to pass therethrough. The width direction of the bus bar 60 coincides with the longitudinal direction of each insertion hole 12. The width direction of the bus bar 60 is the longitudinal direction of the rectangular cross section of the bus bar 60. The longitudinal direction of the insertion hole 12 is the longitudinal direction of the insertion hole 12 that is rectangular when viewed from the first direction D1. That is, the conduction member is a plate-like bus bar. The insertion hole of the bush is rectangular when viewed from the first direction, and is an insertion hole for holding the bus bar. The width direction of the bus bar coincides with the longitudinal direction of the insertion hole.

The flange 13 is an example of a first protrusion, and extends along the third direction D3 as shown in FIG. 3. The flange 13 protrudes outward from the first side surfaces 11c along the second direction D2. As shown in FIG. 4, the flange 13 has a perpendicular surface 13a along the first direction D1 and a lower surface 13b substantially orthogonal to the perpendicular surface 13a.

The rib 14 is an example of a second protrusion, and protrudes outward in the third direction D3 from the second side surface 11d as shown in FIG. 3. That is, the rib protrudes in a direction different from that of the flange. The rib 14 protrudes from a position different from that of the flange 13 when viewed from the first direction D1. As shown in FIGS. 3 and 4, the rib 14 has an upper surface 14a that protrudes substantially orthogonal to the second side surface 11d, and a protruding inclined surface 14b that is inclined from the tip of the upper surface 14a toward the second end surface 11b. That is, the second protrusion has a protruding inclined surface that protrudes outward from a side surface and is inclined from the protruding tip toward the first end surface or the second end surface.

As shown in FIGS. 3 and 4, the bush 10 further includes insertion hole inclined surfaces 12a and 12b. The insertion hole inclined surface 12a is inclined from the first end surface 11a toward the center of the insertion hole 12. The insertion hole inclined surface 12b is inclined from the second end surface 11b toward the center of the insertion hole 12. The insertion hole inclined surface 12a is located on the entire area of the edge between the inner peripheral surface of the insertion hole 12 and the first end surface 11a. The insertion hole inclined surface 12b is located on the entire area of the edge between the inner peripheral surface of the insertion hole 12 and the second end surface 11b. Since the insertion hole inclined surface 12a and the insertion hole inclined surface 12b are provided around the openings of the insertion holes 12, the bush 10 can be easily removed from the mold when the bush 10 is molded. Further, by forming the insertion hole inclined surface 12b on the second end surface 11b side, the bus bar 60 can be easily passed through the insertion hole 12 of the bush 10 from the second end surface 11b side. That is, the main body of the bush has an insertion hole inclined surface that is inclined from the first end surface or the second end surface toward the insertion hole. The insertion hole inclined surface is located on the entire area of the edge between the inner peripheral surface of the insertion hole and the first end surface, or on the entire area of the edge between the inner peripheral surface of the insertion hole and the second end surface.

The bush 10 is formed of an elastic member made of elastomer such as rubber or urethane resin, plastic, or the like. When the bush 10 is elastically deformed, attachment to the motor 1 is facilitated. The bush 10 is made of an insulating material. When the bearing holder 50 is made of metal, the bush 10 can reliably insulate the bus bar 60 from the bearing holder 50.

Figure 9A:
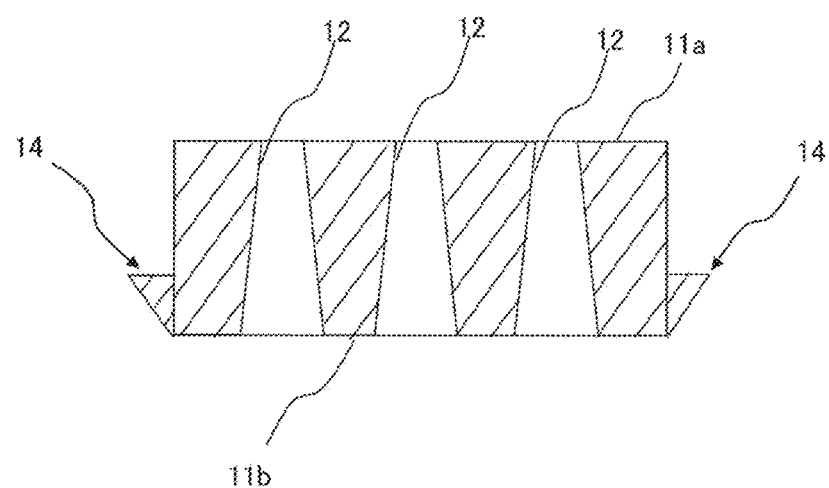
FIG. 9A is a cross-sectional view of a bush according to a modification of an example embodiment of the present disclosure.

As shown in the cross-sectional view of FIG. 9A, the insertion hole 12 may have a tapered shape that extends from the first end surface 11a to the second end surface 11b. This facilitates the insertion of the bus bar 60 to be inserted from the second end surface 11b side.

Figure 9B:
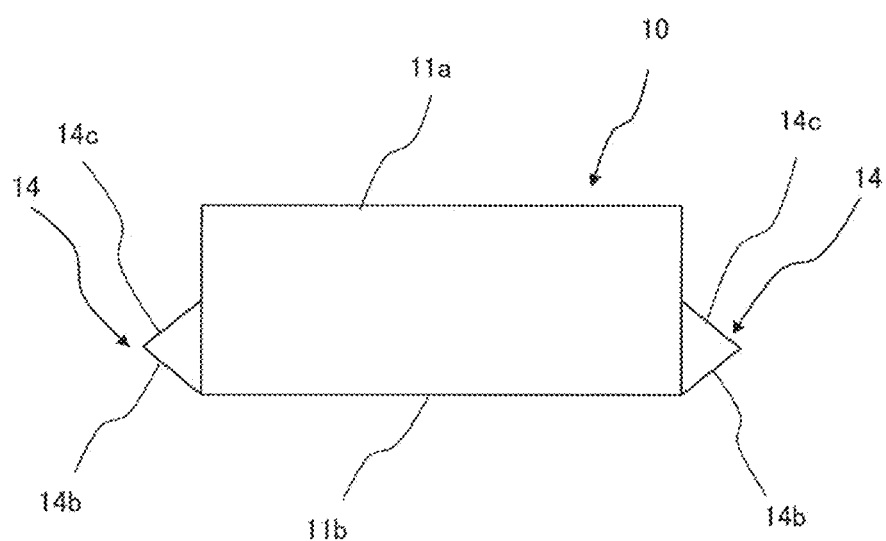
FIG. 9B is a side view of a bush according to another modification of an example embodiment of the present disclosure.

As shown in FIG. 9B, the rib 14 may be formed on a protruding inclined surface 14c whose upper surface protruding from the second side surface 11d is inclined toward the first end surface 11a.

The bearing holder 50 is an example of a casing, and is disposed on the upper side of the stator 40 as shown in FIGS. 1 and 2. The bearing holder 50 has a substantially disk shape when viewed from above, and has an opening portion 55 around the central axis C. The opening portion 55 is a hole through which the shaft 31 passes. The bearing holder 50 supports the upper bearing 71.

The bearing holder 50 may be a plate member that also serves as a heat sink. Further, the bearing holder 50 may have a substantially rectangular shape or the like as long as it can be fixed to the inner peripheral surface of the housing 20. The bearing holder may not be fixed to the inner peripheral surface of the housing.

Figure 5:
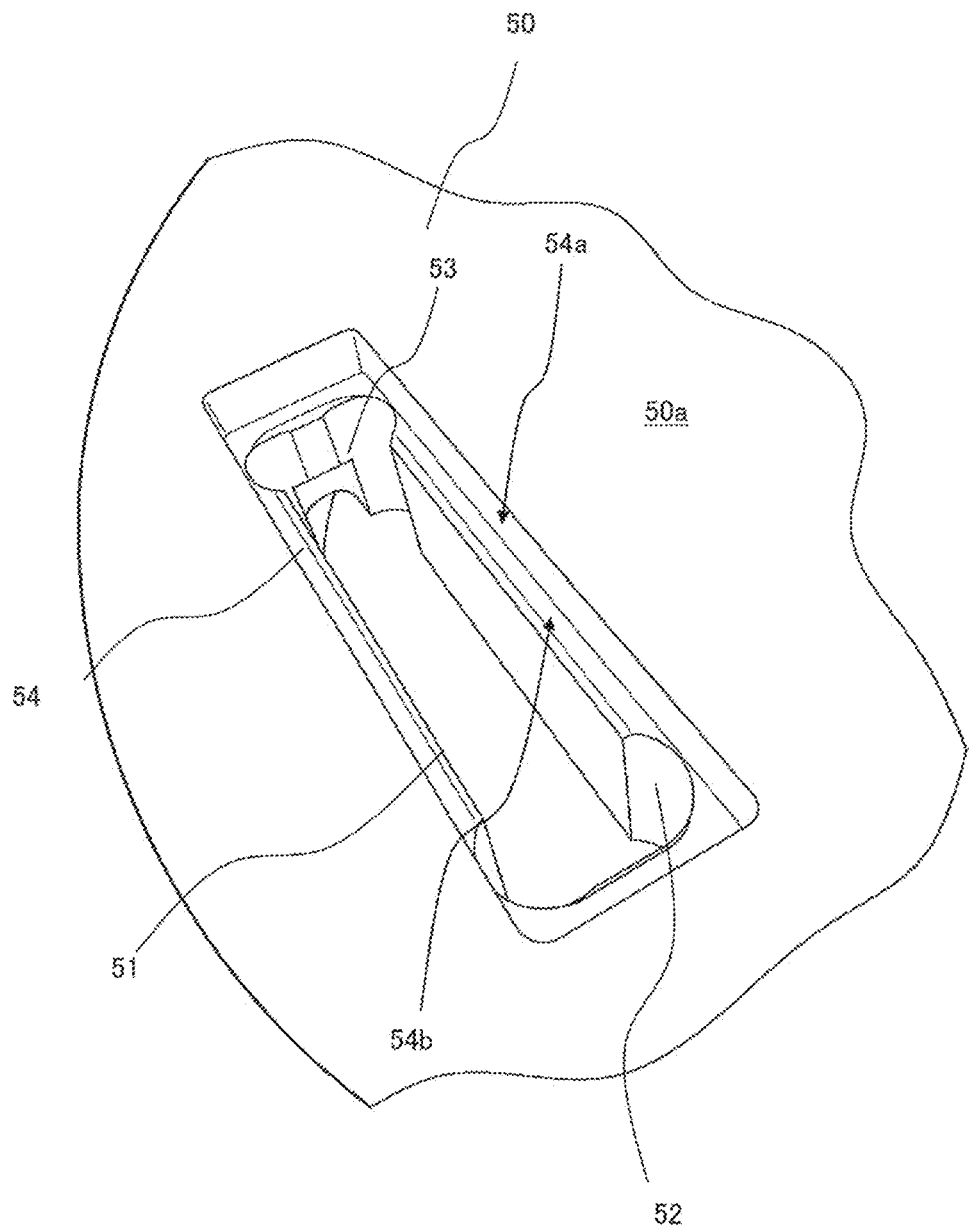
FIG. 5 is a perspective view of a portion of a bearing holder.
Figure 6:
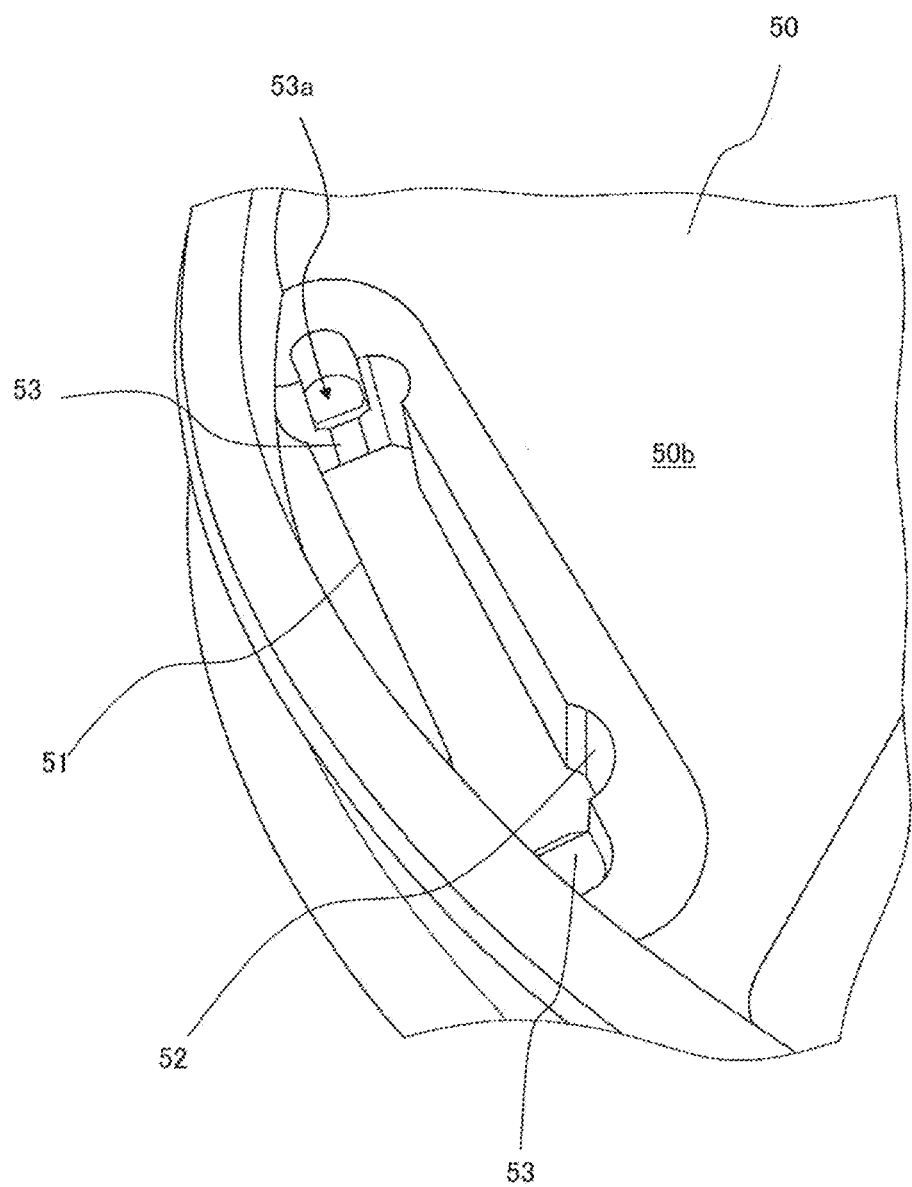
FIG. 6 is a perspective view of a portion of the bearing holder of FIG. 5 as viewed from below.

As shown in FIGS. 5 and 6, the bearing holder 50 has a through hole 51 extending along the circumferential direction of the motor 1. The through hole 51 is a hole that extends in the axial direction of the motor 1 and opens to the upper surface 50a and the lower surface 50b. The bearing holder 50 has a shape that holds the bush 10 described above around the through hole 51. The through hole 51 is rectangular when viewed from the axial direction.

Figure 8:
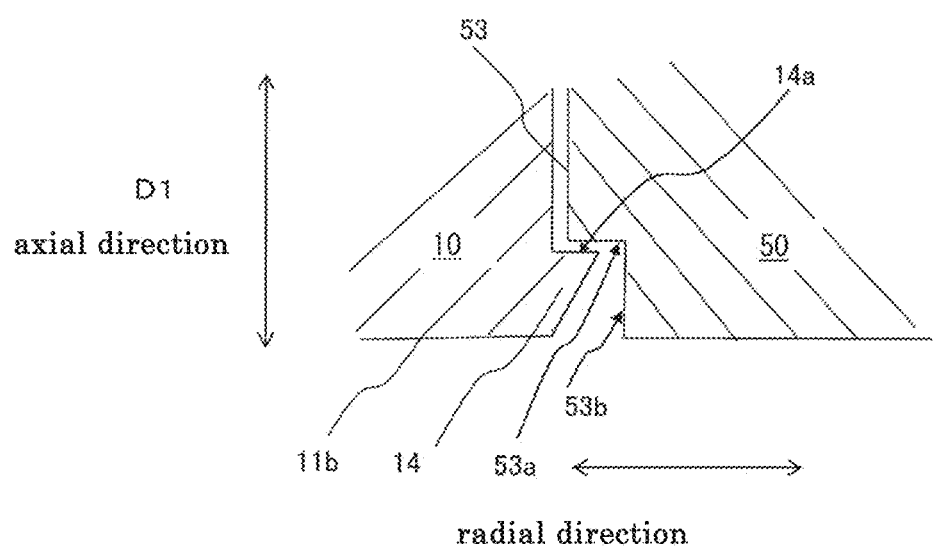
FIG. 8 is a partial cross-sectional view of a bearing holder and a bush.

The bearing holder 50 has a protrusion 53 around the through hole 51. The protrusion 53 protrudes inward from both longitudinal ends of the through hole 51. As shown in FIG. 8, the protrusion 53 has a lower surface 53a substantially orthogonal to the axial direction. The lower surface 53a is orthogonal to the perpendicular surface 53b that forms the lower opening of the through hole 51. The length in the axial direction of the perpendicular surface 53b is equal to the length from the upper surface 14a of the rib 14 to the second end surface 11b. Alternatively, the length in the axial direction of the perpendicular surface 53b is slightly longer than the length from the upper surface 14a of the rib 14 to the second end surface 11b.

When the bush 10 is inserted into the through hole 51 of the bearing holder 50, since the bush 10 is an elastic member, the rib 14 passes through the through hole 51 while being deformed in contact with the protrusion 53. When the rib 14 reaches below the protrusion 53, the rib 14 is elastically recovered, and the upper surface 14a of the rib 14 and the lower surface 53a of the protrusion 53 face each other as shown in FIG. 8. Note that the upper surface 14a does not have to be in contact with the lower surface 53a, and may only face the lower surface 53a. That is, the through hole of the casing is rectangular when viewed from the first direction. The casing has protrusions that protrude inward from both longitudinal ends of the through hole, and contacts the second protrusion or faces the second protrusion in the first direction.

Since the protrusions 53 are provided, the bush 10 does not protrude from the lower surface 50b of the bearing holder 50. Therefore, the axial length of the entire motor can be shortened. Further, since the lower end portion of the bush 10 does not protrude into the motor 1, the space inside the motor 1 can be widely used.

The bearing holder 50 has a recess 54 formed in the opening on the upper surface 50a side around the through hole 51. The recess 54 is a step portion having a perpendicular surface 54a in the axial direction, and a bottom surface 54b substantially orthogonal to the perpendicular surface 54a. The length of the perpendicular surface 54a in the axial direction, that is, the depth of the recess 54, is equal to the thickness of the flange 13 of the bush 10. Alternatively, the depth of the recess 54 is slightly deeper than the thickness of the flange 13 of the bush 10.

In the present embodiment, the recess 54 includes not only a portion facing the flange 13 but also a portion facing the rib 14. The recess 54 only needs to be formed with a stepped portion facing the flange 13, and the stepped portion facing the rib 14 may not be formed. That is, the through hole of the casing is rectangular when viewed from the first direction. The casing has a recess that is formed in the opening on the first end surface side of the through hole, and contacts the first protrusion or faces the first protrusion in the first direction.

Figure 7:
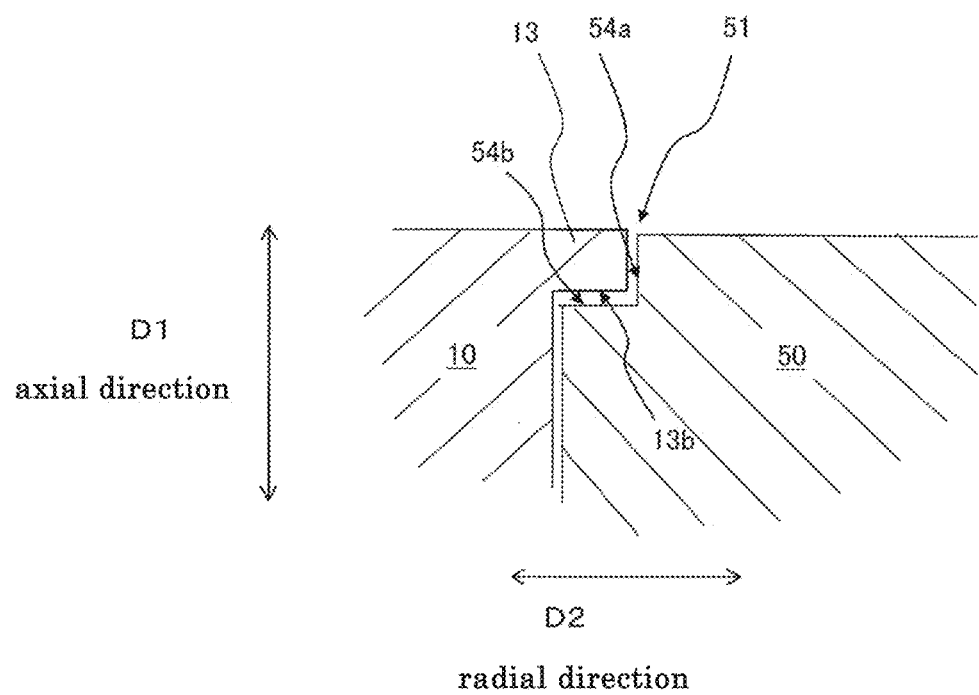
FIG. 7 is a partial cross-sectional view of a bearing holder and a bush.

As shown in FIG. 7, when the bush 10 is inserted into the through hole 51 of the bearing holder 50, the lower surface 13b of the flange 13 and the bottom surface 54b of the recess 54 come into contact with each other. Note that the lower surface 13b and the bottom surface 54b do not have to be in contact with each other, and only need to face each other. Since the recess 54 is provided in this way, the bush 10 does not protrude from the upper surface 50a of the bearing holder 50. Therefore, the axial length of the entire motor can be shortened. Further, since the upper end of the bush 10 in the axial direction does not protrude outside, the upper part of the motor 1 can be widely used as a control space.

Note that the recess 54 may be formed by a slope or a curved surface instead of the stepped portion. In this case, the opposing portion of the flange 13 is also formed on a slope or a curved surface. In other words, the recess 54 may have a shape that accommodates at least a part of the flange 13.

As shown in FIGS. 5 and 6, the through hole 51 has a large portion 52 where the width of the through hole 51 is widened at a rectangular corner. The large portion 52 has an elliptical shape spreading in an arc shape on both sides in the longitudinal direction of the through hole 51. That is, the through hole of the casing is rectangular when viewed from the first direction, and the through hole of the casing has a large portion where the width of the through hole is widened at the rectangular corner of the through hole. Since the large portion 52 is formed, the bush 10 is elastically deformed and easily inserted into the through hole 51 when inserted into the through hole 51.

Although only one through hole 51 is formed in the illustrated example, the present disclosure is not limited to this. A plurality of through holes 51 may be provided. In this case, the plurality of through holes 51 are arranged along the circumferential direction of the motor 1. Further, the shape of the through hole 51 viewed from the upper side is not limited to the illustrated shape. Various shapes such as a curved shape, a circular shape, an elliptical shape, a trapezoidal shape, an inverted trapezoidal shape, and other polygonal shapes may be used, depending on the shape of the bush 10 described later.

In the motor 1 according to the above-described example embodiment, the bush 10 held by the bearing holder 50 includes the flange 13 and the rib 14 that are different in position on a plane viewed from the first direction D1. That is, when viewed from the first direction D1, the first protrusion and the second protrusion do not overlap. In other words, in the orthogonal projection in the first direction D1, the positions of the first protrusion and the second protrusion are different. In the bush 10 of the motor 1, since the flange 13 and the rib 14 do not overlap in the axial direction, the mold can be pulled out from both sides of the bush when viewed from the first direction D1 at the time of manufacturing. Specifically, a jig for forming the flange 13 is inserted from one side in the first direction D1, and a jig for forming the rib 14 is inserted from the other side in the first direction D1. Thus, the jigs for inserting the flange 13 and the rib 14 can be pulled out from different directions in the first direction D1. For this reason, the bush 10 is unlikely to crack. Therefore, it is possible to reduce the manufacturing cost, while preventing the bush 10 from coming off from the bearing holder 50.

Further, the bush 10 is disposed such that the longitudinal direction of the main body 11 is disposed along the circumferential direction of the motor 1, and the short side direction of the main body 11 is disposed along the radial direction of the motor 1. For this reason, it is possible to ensure a wide space radially inward with respect to the bush 10. Therefore, on the inner side in the radial direction of the motor 1, an area where the power element mounted on the control board is disposed can be widened. In particular, in the case of using the bearing holder 50 as a heat sink, the volume of the heat sink can be increased and the space can be used effectively. Moreover, since the power element of the control board can be brought close to the heat sink, the heat dissipation effect can be further enhanced.

Furthermore, the bush 10 is provided with the rib 14 that protrudes along the circumferential direction of the motor 1, so that the position of the motor 1 in the circumferential direction of the motor 1 can be easily adjusted by the elasticity of the ribs 14. For this reason, it is easy to adjust the position in the circumferential direction of the motor 1, that is, in the width direction of the bus bar 60 inserted into the bush 10. The position of the bus bar 60 inserted in the bush 10 in the circumferential direction of the motor 1, that is, the width direction of the bus bar 60, can be adjusted by the elasticity of the rib 14. Therefore, the assembly of the motor 1 can be facilitated.

In the bush 10, the direction in which the position of the bus bar 60 is easily corrected is different from the direction in which the rib 14 protrudes and the rib 14 is easily deformed. Specifically, the position of the bus bar 60 is easily corrected in the thickness direction thereof, that is, in the radial direction of the motor 1. Even if stress is applied in a direction in which the position of the bus bar 60 is easily corrected, the bush 10 is supported by the rib 14. For this reason, the rib 14 is not easily deformed by the stress applied to the bus bar 60. Therefore, the bush 10 can be prevented from coming off from the bearing holder 50.

(1) The bush may be attached to the cylindrical portion 21 of the housing 20 that is an example of a casing. In this case, the first direction D1 coincides with the radial direction of the motor 1, and the cylindrical portion 21 of the housing 20 has a through hole opened in the radial direction. The conduction member inserted into the bush is drawn out radially outward of the cylindrical portion 21.

The bush 10 can be attached to a portion other than the bearing holder 50 and the housing 20. It can be attached to a casing that covers at least a part of the rotor 30 and the stator 40, such as a partition wall other than the bearing holder.

(2) The shape of the bush 10 may be, for example, the following shape.

Figure 10:
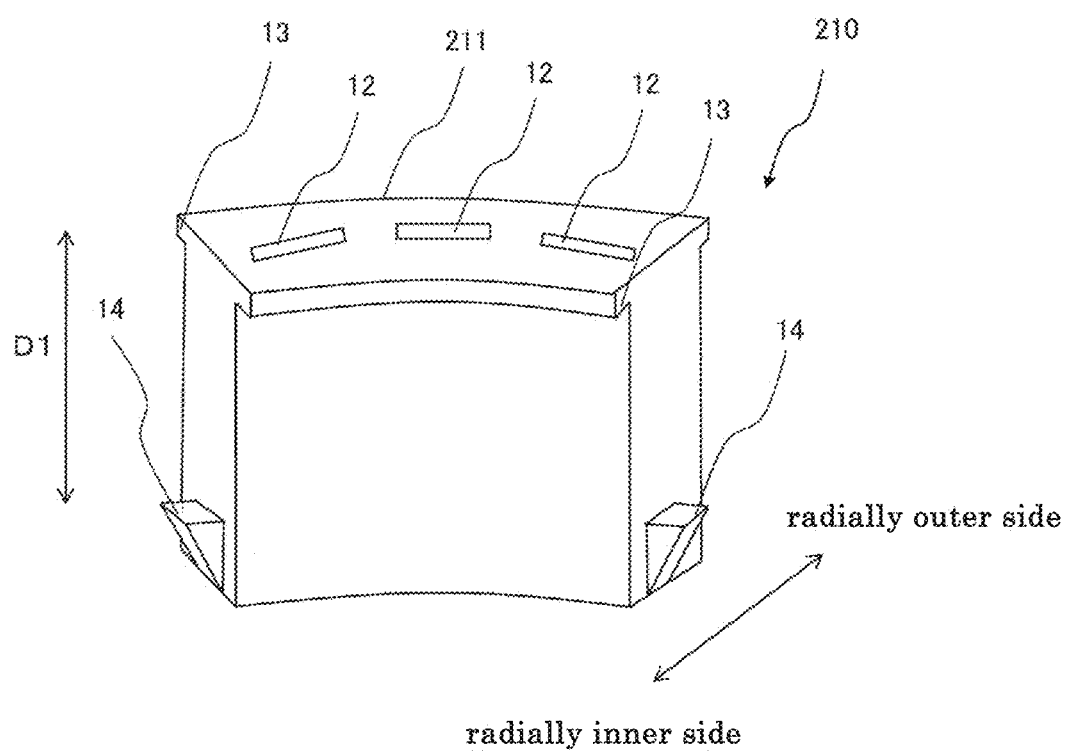
FIG. 10 is a perspective view of a bush according to still another modification of an example embodiment of the present disclosure.

FIG. 10 shows a bush 210 according to a modification. The bush 210 is different from the bush 10 in that the shape of a main body 211 as viewed from the first direction D1 is curved. In this case, it is preferable that the through hole of the bearing holder 50 is also curved along the circumferential direction of the motor 1, in accordance with the shape of the bush 210. Since the bush 210 and the through hole are curved along the circumferential direction of the motor 1, a larger space on the radially inner side than the bush 210 can be secured. Therefore, on the inner side in the radial direction of the motor 1, an area where the power element mounted on the control board is disposed can be widened. In particular, in the case of using the bearing holder 50 as a heat sink, the space can be used effectively such as an increase in the volume of the heat sink.

Figure 11:
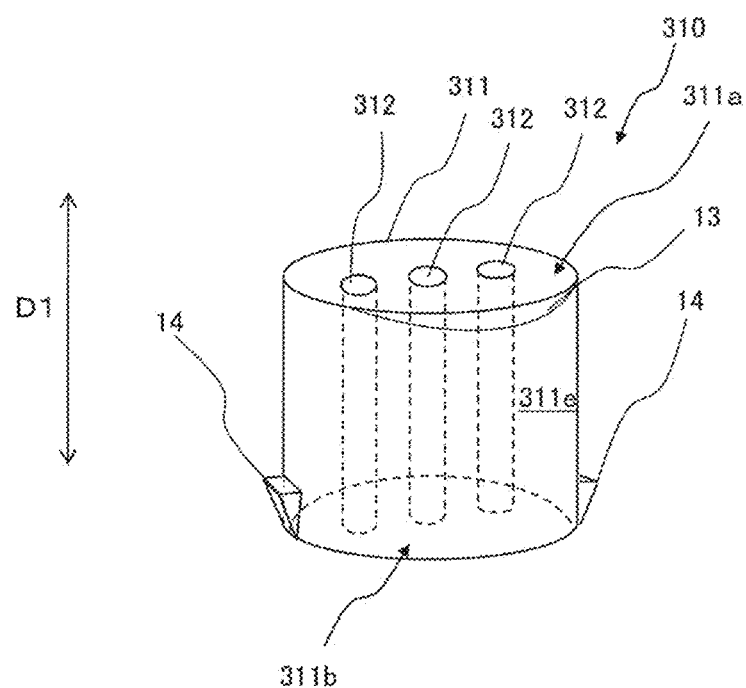
FIG. 11 is a perspective view of a bush according to still another modification of an example embodiment of the present disclosure.

FIG. 11 shows a bush 310 according to another modification. The bush 310 is different from the bush 10 in that a main body 311 is in a substantially columnar shape. The main body 311 includes a first end surface 311a, a second end surface 311b facing the first end surface 311a in the first direction D1, a side surface 311e between the first end surface 311a and the second end surface 311b, and an insertion hole 312. The insertion hole 312 may have a rectangular cross section as in the above example embodiment, but may have a circular cross section so that a coil lead wire can be inserted as in the illustrated example.

Figure 12:
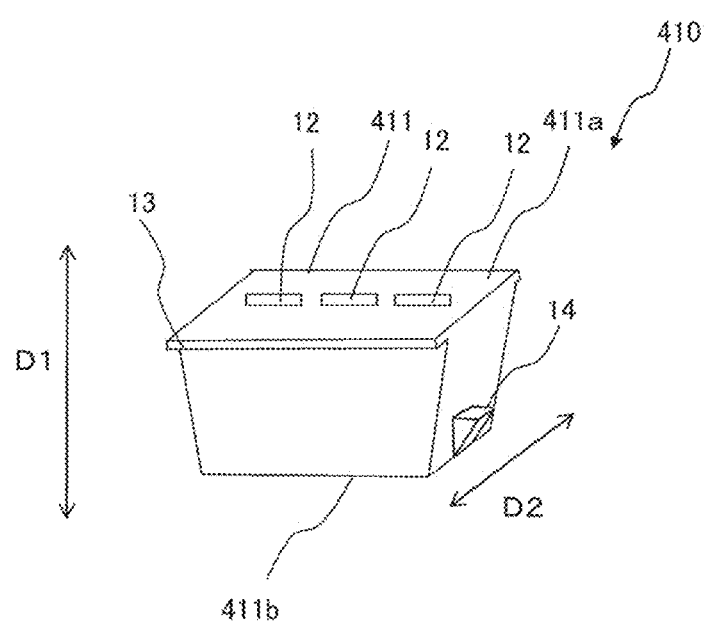
FIG. 12 is a perspective view of a bush according to still another modification of an example embodiment of the present disclosure.

(3) FIG. 12 shows a bush 410 according to another modification. The bush 410 is different from the bush 10 in that the shape of a main body 411 as viewed from the second direction D2 is a trapezoid. A second end surface 411b of the bush 410 in the other modification is smaller than a first end surface 411a. As a result, the bush 410 can be easily inserted into the through hole 51. In the bush 410 as well, as in the example shown in FIG. 9A, the insertion hole 12 may have a tapered shape that extends from the first end surface 411a to the second end surface 411b. This facilitates insertion of the bus bar 60 to be inserted from the second end surface 411b side.

The bush 10 may have other shapes. For example, the main body 11 of the bush 10 may have a cross section in an elliptical shape, a trapezoidal shape, an inverted trapezoidal shape, or other polygonal shape as viewed from the first direction D1.

The first protrusion and the second protrusion are not limited to the shapes of the flange 13 and the rib 14. The first protrusion and the second protrusion only have to protrude from different positions when viewed from the first direction D1. Further, the first protrusion and the second protrusion may be protruded in the same direction.

Figure 13:
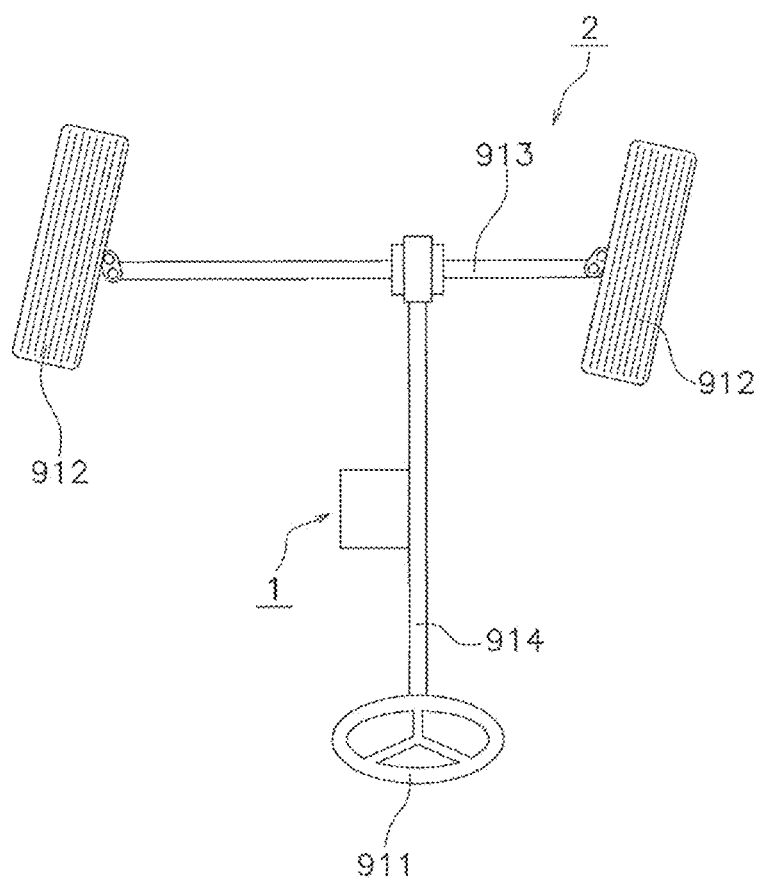
FIG. 13 is a schematic diagram of an electric power steering system according to another example embodiment of an example embodiment of the present disclosure.

With reference to FIG. 13, an example in which the motor is mounted on an electric power steering system 2 will be described.

An electric power steering system 2 is to be mounted on a wheel steering mechanism of an automobile. The electric power steering system 2 is a column-type electric power steering system that directly reduces the steering force by the power of the motor 1. The electric power steering system 2 includes the motor 1, a steering shaft 914, and an axle 913.

The steering shaft 914 transmits input from a steering wheel 911 to the axle 913 having wheels 912. The power of the motor 1 is transmitted to the axle 913 via a ball screw. The motor 1 employed in the column-type electric power steering system 2 is provided inside the engine room (not shown). The electric power steering system 2 shown in FIG. 13 is of a column type, but may be of a rack type.

The electric power steering system 2 includes the motor 1. For this reason, the electric power steering system 2 having the same effect as that of the above example embodiment can be obtained.

Here, although the electric power steering system 2 has been described as an example of a system using the motor 1, the system using the motor 1 is not limited. The motor 1 can be used in a wide range such as a pump and a compressor.

The above-described example embodiments and modifications are to be considered in all respects as illustrative and not restrictive. The scope of the present disclosure is shown not by the above-described example embodiment but by the scope of the claims, and is intended to include all changes within the meaning and scope equivalent to the scope of claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor that is rotatable about a central axis;
a stator radially opposed to the rotor;
a casing including at least one through hole and covering at least a portion of the rotor and the stator;
a bush held in the through hole of the casing; and
a conductor connected to the stator and held by the bush; wherein
the bush includes:
  a main body including a first end surface, a second end surface facing the first end surface in a first direction, and a side surface between the first end surface and the second end surface;
  an insertion hole that penetrates an inside of the main body in the first direction and allows the conductor to pass through;
  a first protrusion that protrudes from the side surface in a direction perpendicular or substantially perpendicular to the first direction; and
  a second protrusion that protrudes from the side surface in the direction perpendicular or substantially perpendicular to the first direction at a position different from a position of the first protrusion in the first direction;
the positions of the first protrusion and the second protrusion are different from each other on a plane viewed from the first direction;
the through hole of the casing has a rectangular or substantially rectangular shape when viewed from the first direction; and
the through hole of the casing includes a large portion in which a width of the through hole is increased at a corner of the rectangular or substantially rectangular shape of the through hole.

2. The motor according to claim 1, wherein the first protrusion protrudes in a direction different from a direction in which the second protrusion protrudes.

3. The motor according to claim 1, wherein
the side surface of the main body includes first side surfaces facing each other in a second direction perpendicular or substantially perpendicular to the first direction, and second side surfaces facing each other in a third direction perpendicular or substantially perpendicular to the first direction and the second direction;
the third direction is a longitudinal direction of the main body;
the first protrusion protrudes from the first side surface in the second direction and extends along the third direction; and
the second protrusion protrudes from the second side surface in the third direction.

4. The motor according to claim 3, wherein
the bush includes a plurality of the insertion holes; and
the plurality of insertion holes are arranged side by side in the third direction.

5. The motor according to claim 1, wherein the first direction is a direction along a central axis of the motor.

6. The motor according to claim 1, wherein the bush includes an elastic member.

7. The motor according to claim 1, wherein the second protrusion includes a protruding inclined surface that protrudes outward from the side surface and inclines from a protruding tip toward the first end surface or the second end surface.

8. The motor according to claim 1, wherein
the conductor is a plate-shaped bus bar;
the insertion hole of the bush has a rectangular or substantially rectangular shape when viewed from the first direction, and is an insertion hole to hold the bus bar; and
a width direction of the bus bar coincides with a longitudinal direction of the insertion hole.

9. The motor according to claim 1, wherein
the main body of the bush includes an insertion hole inclined surface inclined from the first end surface or the second end surface toward the insertion hole; and
the insertion hole inclined surface is located in an entire area of an edge between an inner peripheral surface of the insertion hole and the first end surface, or in an entire area of an edge between the inner peripheral surface of the insertion hole and the second end surface.

10. The motor according to claim 1, wherein
the through hole of the casing has a rectangular or substantially rectangular shape when viewed from the first direction; and the casing includes a recess that is located in an opening of the through hole on a first end surface side and contacts the first protrusion or faces the first protrusion in the first direction.

11. The motor according to claim 1, wherein the casing includes a housing or a bearing holder.

12. An electric power steering system comprising the motor according to claim 1.

13. A motor comprising:
a rotor that is rotatable about a central axis;
a stator radially opposed to the rotor;
a casing including at least one through hole and covering at least a portion of the rotor and the stator;
a bush held in the through hole of the casing; and
a conductor connected to the stator and held by the bush; wherein
the bush includes:
a main body including a first end surface, a second end surface facing the first end surface in a first direction, and a side surface between the first end surface and the second end surface;
an insertion hole that penetrates an inside of the main body in the first direction and allows the conductor to pass through;
a first protrusion that protrudes from the side surface in a direction perpendicular or substantially perpendicular to the first direction; and
a second protrusion that protrudes from the side surface in the direction perpendicular or substantially perpendicular to the first direction at a position different from a position of the first protrusion in the first direction;
the positions of the first protrusion and the second protrusion are different from each other on a plane viewed from the first direction;
the main body of the bush includes an insertion hole inclined surface inclined from the first end surface or the second end surface toward the insertion hole; and
the insertion hole inclined surface is located in an entire area of an edge between an inner peripheral surface of the insertion hole and the first end surface, or in an entire area of an edge between the inner peripheral surface of the insertion hole and the second end surface.

* * * * *